United States Patent [19]
Deane

[11] 3,884,656
[45] May 20, 1975

[54] RECIRCULATING AIR CLEANER

[76] Inventor: Clifford T. Deane, P.O. Box 817, Strawberry Rd., St. Albans, W. Va. 25177

[22] Filed: June 28, 1974

[21] Appl. No.: 485,148

[52] U.S. Cl. ................... 55/257; 55/317; 55/319; 55/340; 55/467
[51] Int. Cl. ........................................... B01d 47/06
[58] Field of Search ............... 55/235, 237–239, 55/257, 317, 319, 338–340, 392, 394, 398, 467, 470, 401, 406; 261/89, 90, DIG. 54

[56] References Cited
UNITED STATES PATENTS

| | | | |
|---|---|---|---|
| 856,731 | 6/1907 | Saaler | 261/90 |
| 1,544,418 | 6/1925 | Bahnson | 261/89 UX |
| 1,856,685 | 5/1932 | Anderson | 55/338 X |
| 2,373,969 | 4/1945 | Lincoln | 55/338 |
| 2,482,642 | 9/1949 | Sylvan | 55/338 |
| 2,595,175 | 4/1952 | Sonderegger | 55/235 X |
| 2,788,087 | 4/1957 | Lenehan | 55/338 |
| 3,102,800 | 9/1963 | Bora | 55/257 |
| 3,191,364 | 6/1965 | Sylvan | 55/257 |
| 3,533,222 | 10/1970 | Gasperini | 55/394 X |
| 3,788,043 | 1/1974 | Dorr et al. | 55/237 |
| 3,802,162 | 4/1974 | Deane | 55/238 X |

FOREIGN PATENTS OR APPLICATIONS

| | | | |
|---|---|---|---|
| 895,669 | 5/1962 | United Kingdom | 55/237 |

*Primary Examiner*—Frank W. Lutter
*Assistant Examiner*—Kathleen J. Prunner
*Attorney, Agent, or Firm*—Clarence A. O'Brien; Harvey B. Jacobson

[57] ABSTRACT

An air cleaning device having a cylindrical housing into which contaminated air is drawn at one axial end by an impeller assembly together with a spray of water. A dense body of contaminated air and water is centrifugally concentrated radially outwardly of a central body of cleaned air discharged from the exhaust end of the housing by the vortical flow producing action of the impeller assembly. The air and water mixture is separated into a slurry of liquid and solid contaminants and a gas which is recycled back to the intake end of the housing.

10 Claims, 5 Drawing Figures

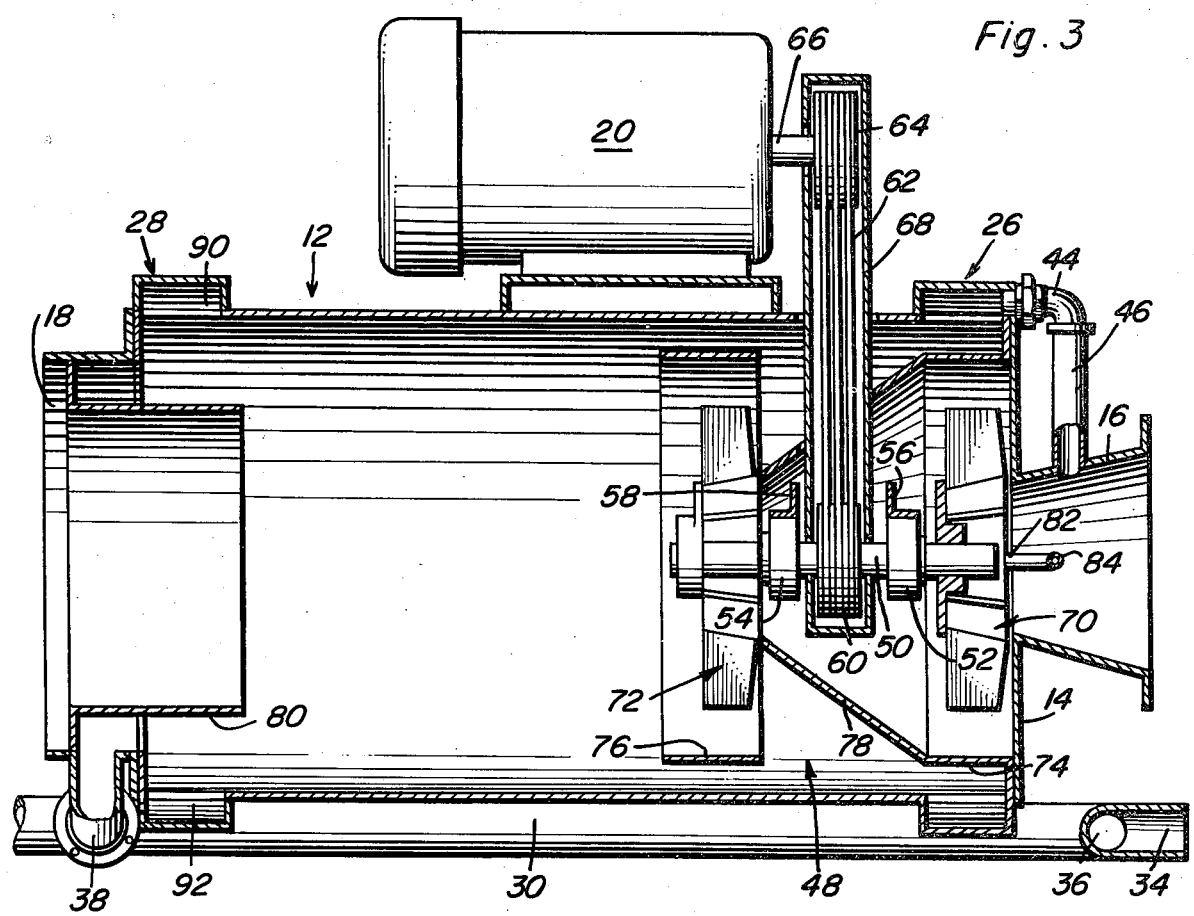

RECIRCULATING AIR CLEANER

This invention relates to an air cleaning device in general and in particular to an improved form of air cleaning apparatus designed for industrial installations in which the air becomes extremely polluted with particulate solid contaminants such as dust and other solid residues produced as a result of various industrial processes.

The air cleaning device of the present invention constitutes an improvement over the air cleaning device disclosed in my prior U.S. Pat. No. 3,802,162, issued Apr. 9, 1974. It is an important object of the present invention to provide an air cleaning device which operates more efficiently and with greater capability than the air cleaning device disclosed in my prior patent aforementioned by virtue of a unique slurry collecting arrangement and gas recycling system.

In accordance with the present invention, contaminated air is drawn into one axial end of a horizontally elongated housing by means of an impeller assembly which produces a vortical flow of the intake fluid as the fluid is axially impelled toward the opposite discharge end of the housing. Water is injected into the inflowing air in order to entrain particulate solids and thereby enhance separation of contaminants from the air. The vortical flow action of the impeller assembly produces an axial flow stream having the denser components concentrated radially outwardly so that a relatively clean body of air is discharged through a central exhaust conduit projecting axially into the discharge end of the housing. The denser body of fluid is collected within slurry boxes located adjacent opposite axial ends of the housing and radially outwardly thereof. A slurry of water and solid particles settles or is gravitationally separated from the remaining air and any denser gases mixed therewith. The gases are conducted by gas flow conduits from upper gaseous zones of the slurry boxes back to the intake for recycling purposes. In this fashion, a more positive separating action is effected preventing the continuous outflow of cleaned air from picking up contaminants.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 3 is a side sectional view taken substantially through a plane indicated by section line 3—3 in FIG. 2.

FIG. 4 is a schematic side elevational view of the apparatus shown in FIGS. 1-3 with parts broken away to show fluid flow paths.

Figure 1:
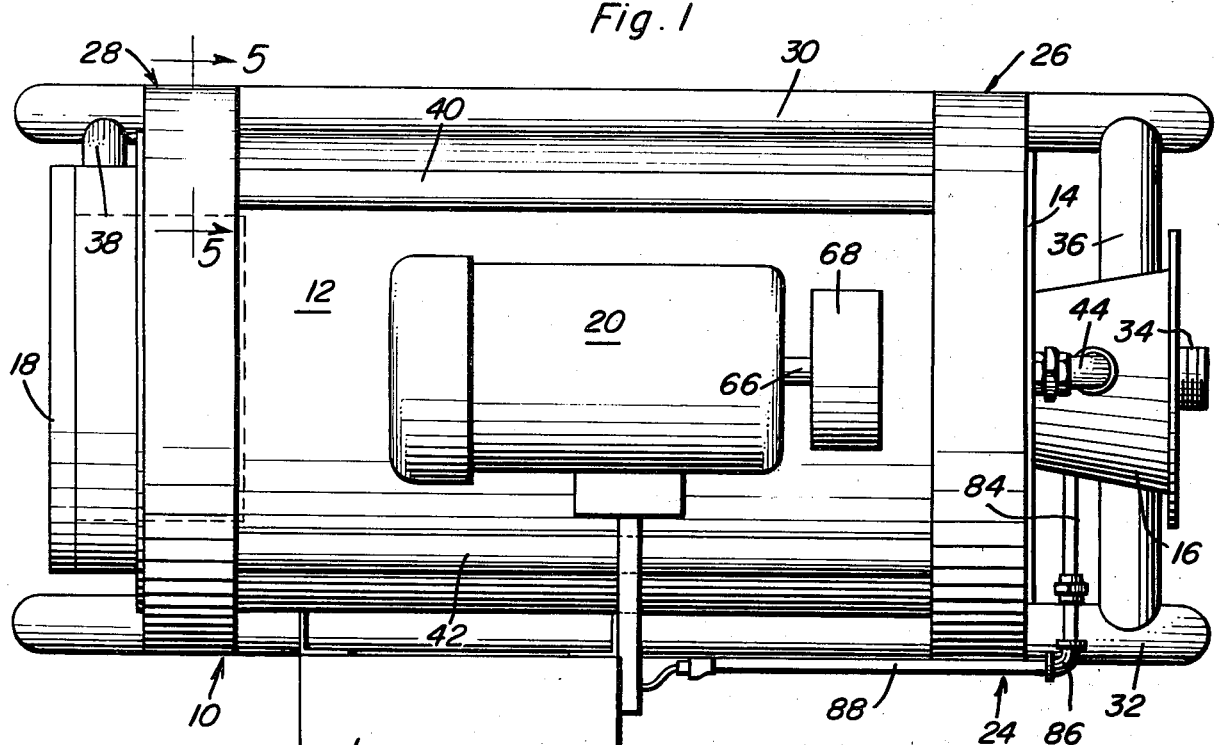
FIG. 1 is a top plan view of an air cleaning device constructed in accordance with the present invention.
Figure 2:
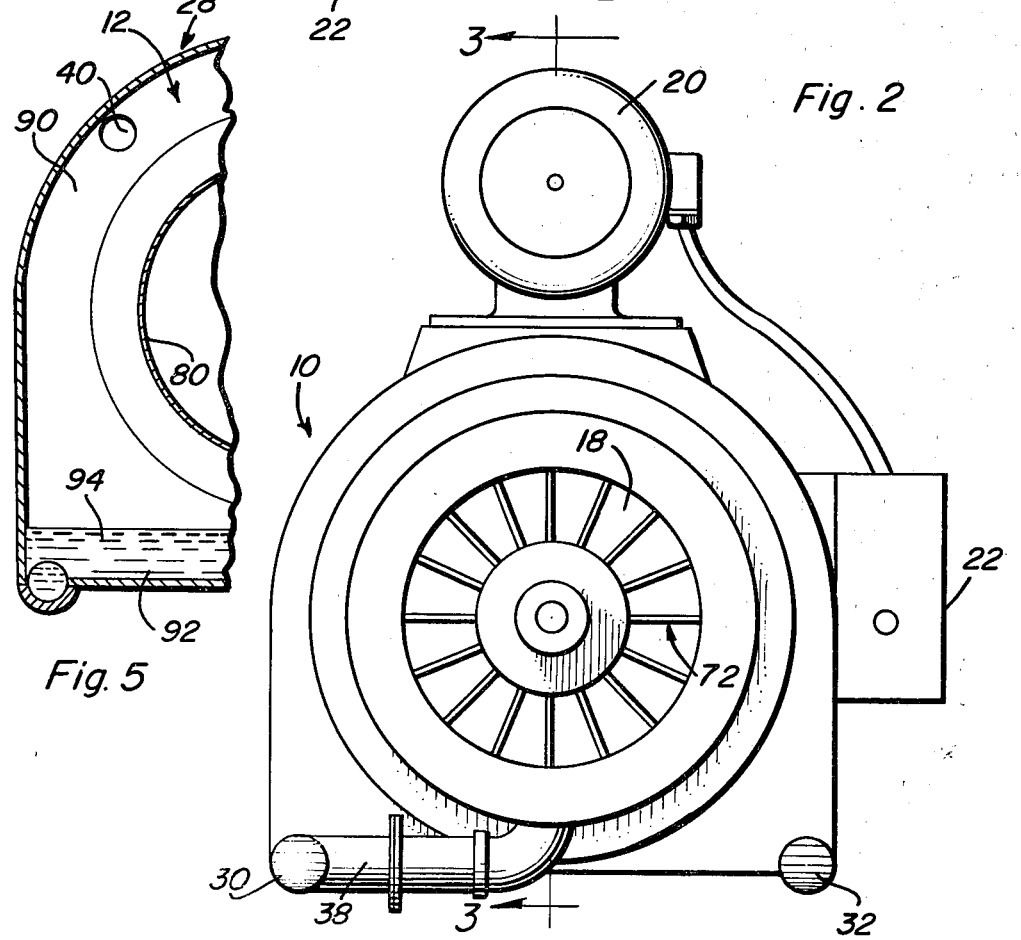
FIG. 2 is a rear end elevational view of the apparatus shown in FIG. 1.

Referring now to the drawings in detail, FIGS. 1 and 2 illustrate one embodiment of the air cleaning device of the present invention generally denoted by reference numeral 10. The air cleaner includes a cylindrical housing generally referred to by reference numeral 12 which is horizontally positioned so as to present one axial end 14 to which a conical intake member 16 is centrally connected. The intake member converges inwardly toward the inlet end 14 of the housing so as to conduct an inflow of contaminated air. Cleaned air is discharged axially from the housing at the discharge end 18. An electric drive motor 20 is mounted on top of the housing 12 in order to operate the air cleaner as will be explained in detail hereafter. Electrical power for energizing the motor is supplied through a power control box 22 which also controls the supply of water to a water injection system generally referred to by reference numeral 24 interconnected between the control box 22 and the intake member 16.

A pair of slurry collection boxes or collection manifolds 26 and 28 encircle the housing 12 adjacent opposite axial ends 14 and 18 and are interconnected with a pair of parallel spaced, longitudinal drain conduits 30 and 32 which extend longitudinally beyond the housing 12 and are located therebelow. The drain conduits 30 and 32 are interconnected with a drain outlet 34 by a cross conduit 36 disposed below the intake member 16. The axial end portion of the housing adjacent the discharge end 18 is interconnected with the drain conduit 30 by means of a connecting conduit 38 underlying the housing on one lateral side thereof. The upper portions of the slurry boxes 26 and 28 above the housing 12 are interconnected by parallel spaced gas flow conduits 40 and 42. The upper portion of the slurry box 26 adjacent the inlet end 14 of the housing is interconnected with the intake member 16 by means of an elbow 44 and vertical pipe section 46 as shown in FIGS. 3 and 4.

Referring now to FIG. 3 in particular, an impeller assembly generally referred to by reference numeral 48 is mounted internally within the housing 12 adjacent to the inlet end 14 which is closed except for the opening to which the intake member 16 is connected. The impeller assembly includes an impeller shaft 50 rotatably supported by a pair of bearing assemblies 52 and 54 fixedly supported within the housing by horizontal cross frame members 56 and 58. A driven pulley wheel 60 is connected to the impeller shaft between the bearing assemblies 52 and 54 and is drivingly connected by an endless belt 62 to a drive pulley wheel 64 connected to the power output shaft 66 of the drive motor. The pulley wheels and endless drive belt 62 are enclosed within a drive casing 68 that extends radially into the housing through an opening on top thereof. Thus, the drive motor 20 when energized will impart rotation to a pair of impeller blade assemblies 70 and 72 fixed to the impeller shaft 50 in axially spaced relationship to each other on opposite axial sides of the bearing assemblies 52 and 54. The impeller blade assembly 70 adjacent the inlet end 14 is enclosed within an annular cowling 74 whereas the impeller blade assembly 72 is enclosed within an annular cowling 76. A conical flow section 78 is connected to the cowling 74 and converges toward the cowling 76 radially inwardly thereof. Thus, the axial inflow of air induced by rotation of the blade assembly 70, will be increased in velocity toward the impeller blade assembly 72 by the conical flow section 78 in order to produce a high velocity flow stream. Further, the impeller blade assembly 72 will not only enhance the axial flow of air through the housing toward the discharge end 18, but will also impart a vortical flow component to the air flow stream resulting in the concentration of the more dense components of the fluid stream radially outwardly of an exhaust conduit 80 connected to the discharge end 18 of the housing and projecting axially inwardly into the housing. Thus, a less dense and cleaned air portion of the fluid stream will be separated from the more dense portion of the flow stream within which the contaminants are concentrated.

In order to enhance the centrifugal separating action of the impeller assembly 48, water is injected into the inflowing air by means of the water injection system 24 which includes a spray nozzle 82 projecting axially and centrally through the opening in the intake end 14. The spray nozzle 82 is connected to the control box 22 through a vertical conduit section 84, an elbow section 86 and a horizontal conduit section 88 as more clearly seen in FIG. 1.

Figure 5:
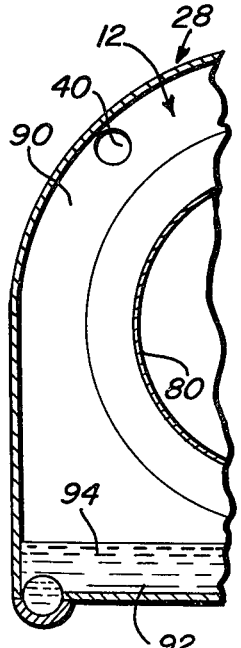
FIG. 5 is a partial sectional view taken substantially through a plane indicated by section line 5—5 in FIG. 1.

As a result of the vortical flow induced by the impeller assembly 48, and the injection of water into the inflowing air, the radially outer portion of the fluid flow stream will consist of a mixture of water, air and the contaminants entrained therewithin. This mixture will be received within the slurry boxes 26 and 28. As more clearly seen in FIG. 5, each of the slurry boxes includes an upper zone 90 interconnected by the gas flow conduits 40 and 42 and a lower collection zone 92 interconnected by the drain conduits 30 and 32. Within the slurry boxes, the mixture of air, liquid and contaminants is gravitationally separated into a slurry 94 that settles within the lower zone 92 and a gaseous phase within the upper zone 90. The gaseous phase is conducted toward the inlet end by the gas flow conduits 40 and 42 and is recycled through the air cleaner by being introduced into the intake member 16 from the upper portion of the front slurry box 26 through the elbow 44 and vertical conduit section 46. The slurry 94 which consists of the water and contaminants removed from the air, is also conducted toward the inlet end of the housing by the drain conduits 30 and 32 interconnecting the slurry boxes. The slurry is removed from the apparatus through the drain outlet 34 to which the drain conduits are connected by the cross conduit 36. The flow of the slurry through the drain conduits 30 and 32 and the flow of gas through the gas flow conduits 40 and 42 for recycling through the intake member 16, is diagrammed in FIG. 4. Any liquid collected at the discharge end of the housing is furthermore conducted to the drain conduit 30 by the connecting conduit 38.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A gas cleaning device, comprising an elongated housing having opposite axial ends, intake means connected to one of said axial ends for conducting an axial inflow of gas with particulate contaminants entrained therein, exhaust means connected to said other of the axial ends for discharging an outflow of said gas, impeller means operatively mounted within said housing adjacent said intake means for inducing said inflow of gas and producing a vortical flow thereof toward the exhaust means, liquid injection means extending into the intake means for injecting liquid into the housing to form a mixture of said contaminated gas and the liquid centrifugally maintained radially outwardly of the exhaust means, separating means connected to the housing in radially spaced relation to the exhaust means for receiving said mixture from the housing and separating a slurry of the liquid and contaminants therefrom, drain means connected to the separating means for removing the slurry therefrom, and gas flow conduit means connecting said separating means to the intake means for recycling the gas separated from the slurry.

2. The combination of claim 1 wherein said separating means includes a slurry box enclosing the housing in radially spaced relation to the exhaust means and having a lower collection zone within which the slurry accumulates upon gravitational separation from the gas, and an upper zone from which the gas is withdrawn through the gas flow conduit means.

3. The combination of claim 2 wherein said separating means includes a second slurry box, said slurry boxes being respectively positioned on the housing adjacent said opposite axial ends.

4. The combination of claim 2 wherein said drain means includes a drain conduit connected to the slurry box at the lower collection zone below the housing.

5. The combination of claim 1 including a drive motor mounted externally on the housing and drive means extending radially into the housing for drivingly connecting the motor to the impeller means.

6. The combination of claim 1 wherein said separating means includes a collection manifold having a lower zone within which the slurry accumulates and an upper zone connected to the gas flow conduit means into which gas escapes from the accumulated slurry.

7. A gas cleaning device, comprising an elongated housing having opposite axial ends, intake means connected to one of said axial ends for conducting an axial inflow of gas with particulate contaminants entrained therein, exhaust means connected to said other of the axial ends for discharging an outflow of said gas, impeller means operatively mounted within said housing adjacent said intake means for inducing said inflow of gas and producing a vortical flow thereof toward the exhaust means, liquid injection means extending into the intake means for injecting liquid into the housing to form a mixture of said contaminated gas and the liquid centrifugally maintained radially outwardly of the exhaust means, separating means connected to the housing in radially outer relation thereto for receiving said mixture from the housing and separating a slurry of the liquid and contaminants therefrom, drain means connected to the separating means for removing the slurry therefrom, and gas flow conduit means connecting said separating means to the intake means for recycling the gas separated from the slurry, said separating means including a slurry box enclosing the housing in radially spaced relation to the exhaust means and having a lower collection zone within which the slurry accumulates upon gravitational separation from the gas, and an upper zone from which the gas is withdrawn through the gas flow conduit means, said separating means including a second slurry box, said slurry boxes being respectively positioned on the housing adjacent said opposite axial ends, said gas flow conduit means including an axially extending tube interconnecting the slurry boxes at the upper zones and a return tube connecting one of the slurry boxes at the upper zone thereof to the intake means.

8. The combination of claim 7 wherein said drain means includes a drain conduit connected to the slurry boxes at the lower collection zones below the housing.

9. The combination of claim 8 wherein said gas is air and the liquid is water.

10. In combination with a gas cleaning device having a housing through which a vortical flow stream of contaminated gas is conducted toward an exhaust outlet and liquid is injected into the flow stream to form a slurry of liquid and contaminants centrifugally separated from the gas discharged from the outlet; the improvement comprising collection means connected to the housing in radially spaced relation to the outlet for receiving said slurry, said collection means enclosing a lower collection zone within which the slurry accumulates and an upper zone within which gas evolving from the accumulated slurry is received, and gas recycling means connected to the upper zone of the collection means in radially spaced relation to the outlet for returning said evolving gas to the vortical flow stream within the housing.

* * * * *